Patented Aug. 25, 1953

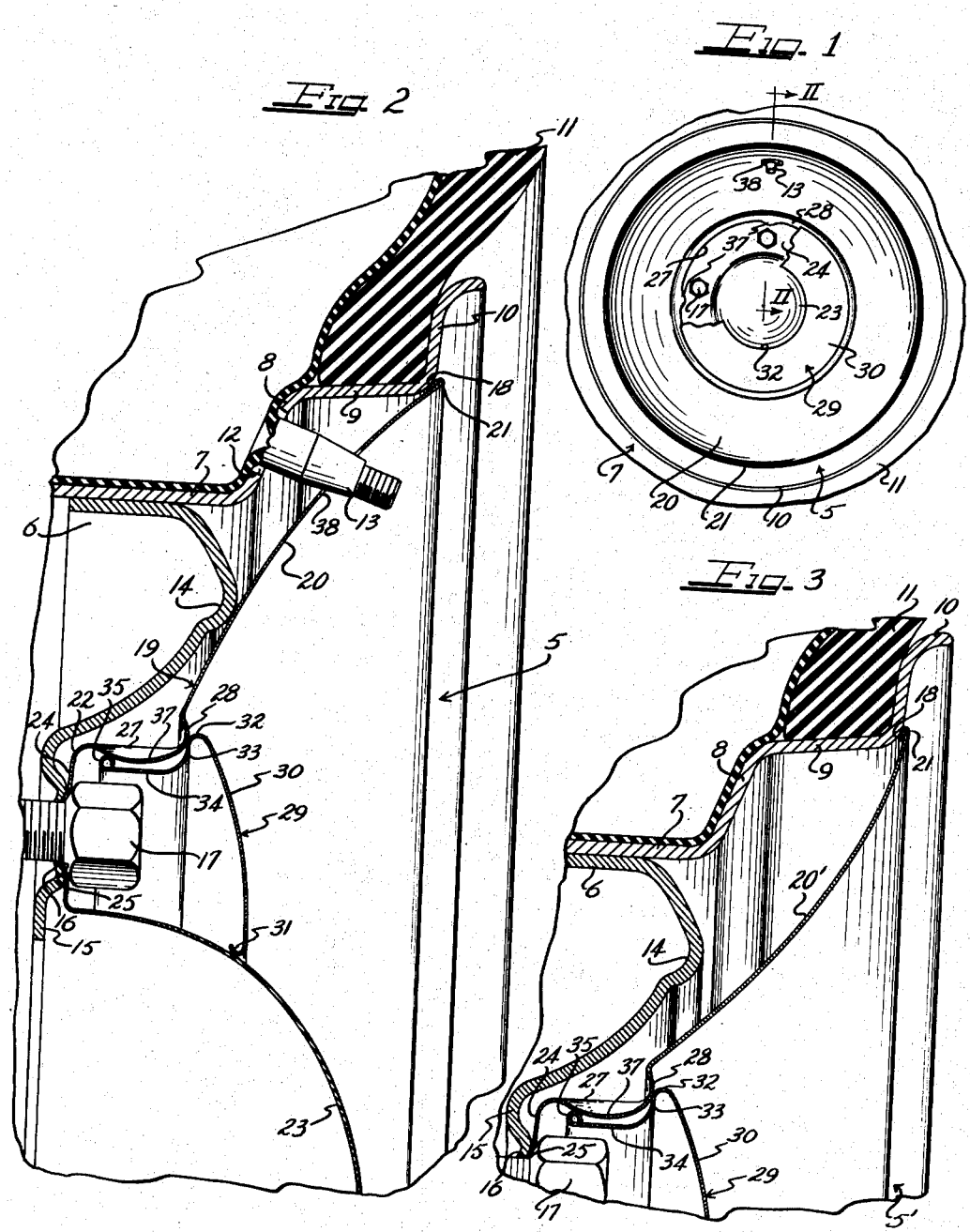

2,650,135

UNITED STATES PATENT OFFICE 2,650,135

WHEEL COVER

George Albert Lyon, Detroit, Mich.

Application October 12, 1948, Serial No. 54,167

12 Claims. (Cl. 301—37)

The present invention relates to improvements in wheel structures and more particularly concerns improvements in the protective and ornamental covering of the outer side of a vehicle wheel such as an automobile wheel or the like.

An important object of the present invention is to provide in a wheel structure of the type including a tire rim and a load sustaining body part, a novel cover of efficient, attractive character.

Another object of the present invention is to provide in a wheel structure a novel cover assembly affording an unusual ornamental effect.

A further object of the present invention is to provide a composite wheel cover for disposition at the outer side of a vehicle wheel and which includes a novel arrangement for maintaining the cover components in assembly.

Still another object of the invention is to provide in an ornamental wheel cover an arrangement of a plurality of cover components interrelated in snap-on, pry-off assembly and including improved means for affording safe pry-off without damaging any ornamental surface of the cover assembly.

Yet another object of the invention is to provide in a cover assembly a novel arrangement of reflective surfaces affording an unusually attractive ornamental appearance.

According to the general features of the invention there is provided in a wheel structure including a tire rim and a wheel body, the wheel body being set in from the outer side of the tire rim and having a bolt-on flange near the median plane of the wheel with substantially clear access from an axially outer side point on the tire rim to the bolt-on flange of the wheel body, a wheel cover assembly including a circular cover member having a radially outer generally radially and axially outwardly extending annular portion adapted to extend from said point on the tire rim to the bolt-on flange for attachment to the bolt-on flange and including a central axially outwardly convex hub cap simulating crown portion joined with the radially outer annular portion by a flat bottomed groove seating against the bolt-on flange of the wheel body for attachment thereto, and an ornamental bead bridging between the annular and crown portions and concealing the outwardly opening groove defined by said rib.

According to other features of the invention the annular and crown portions have the surfaces thereof extending generally axially outwardly beyond the surface of the ornamental bead and the bead has its surface finished in a contrasting color to the surfaces of the annular and crown portions.

According to other general features of the invention there is provided an ornamental wheel cover for disposition at the outer side of a vehicle wheel, said wheel cover including a circular cover member and having an annular trim ring portion and a central hub cap simulating crown portion with an intervening axially inwardly extending flat bottomed rib affording an axially outwardly opening annular groove, one of said portions having retaining means at said rib within the groove defined thereby, and an ornamental bead retainingly engaging said retaining means and closing said groove.

According to other features of the invention the annular trim ring portion and the central crown portion have the surfaces thereof extending generally axially outwardly beyond the ornamental bead, and the bead has its outer surface tilted toward the trim ring portion but also within the reflective range of said crown portion.

According to still other features of the invention, the trim ring annular portion has a generally axially outwardly projecting shoulder at the juncture thereof with said groove forming rib and said bead rests thereon and is held thereby in axially outwardly offset relation to the adjacent area of the trim ring portion to facilitate entry of a pry-off tool between said shoulder and the bead.

Other objects, features and advantages of the present invention will be readily apparent from the following detailed description of certain preferred embodiments thereof taken in conjunction with the accompanying drawings, in which:

Figure 1 is a fragmentary side elevational view of a vehicle wheel including a cover according to the present invention;

Figure 2 is an enlarged radial sectional view through the assembly of Figure 1 taken substantially on the line II—II; and Figure 3 is a radial sectional view substantially like Figure 2, but showing a slight modification.

As shown on the drawings:

A wheel cover 5 according to the present invention is adapted to be applied to a vehicle wheel such as an automobile wheel including a wheel body 6 and a tire rim 7. The tire rim is of the multi flange type including the customary base flange, side wall flanges 8, intermediate axially outwardly extending flanges 9 and terminal flanges 10, only those flanges at the outer side of the wheel being shown.

A pneumatic tire and tube assembly 11 is adapted to be supported by the tire rim. The outer side flange 8 of the tire rim is formed with an opening 12 through which a valve stem 13 extends. The wheel body is formed with a relatively small intermediate annular reinforcing rib or nose bulge 14 that projects axially outwardly short of the juncture rib afforded between the base and side flanges of the tire rim and then dips in dished formation axially and radially inwardly to a bolt-on flange 15 which is preferably disposed at approximately the median plane or center line of the wheel. Appropriate apertures 16 in the bolt-on flange receive the shanks of headed wheel attachment bolts 17 for attaching the wheel to the hub or axle structure of a vehicle (not shown). Both the wheel body 6 and tire rim 7 may be made from appropriate gauge sheet metal stamped or rolled to shape, the components being assembled by welding or riveting.

As will be observed from Figure 2, the relationship of the wheel body and the tire rim are such that substantially clear access to the bolt-on flange 15 is afforded on a diagonal line from a shoulder 18 defining the juncture between the intermediate flange 9 and the terminal flange 10, and past the reinforcing rib or nose bulge 14 to the radially outer side of the bolt-on flange 15. Thus, the tire rim and the wheel body together afford a deeply dished structure. It is within this dished formation of the wheel that the cover 5 is received.

As its principal component, the cover 5 comprises a circular cover member 19 which is adapted to substantially conceal the outer side of the wheel body inside of the tire rim terminal flange 10. To this end, the cover component 19 comprises an annular trim ring radially outer portion 20 of generally dished shape generally conformable to the dished general formation of the wheel, having its radially outer margin turned under to afford a reinforced edge 21 which is adapted to seat against the tire rim shoulder 18. From this outer edge 21, the trim ring portion 20 extends axially and radially inwardly past the reinforcing rib 14 of the wheel body and axially and radially inwardly therebeyond to a generally axially inwardly projecting annular flat bottomed annular rib 22 comprising an intermediate juncture portion by which the trim ring annular portion 20 is joined with a central axially outwardly projecting convex crown portion 23. The rib portion 22 has a relatively flat bottom or base wall 24 which registers with the bolt apertures 16 and the bolt-on flange 15 of the wheel body and has appropriate bolt apertures 25 in assembly registered with the bolt apertures 16 whereby the attachment bolts 17 secure the cover to the wheel and more especially to the bolt-on flange 15, with the radially outer edge 21 of the cover maintained under tension by axially inward flexing as a result of the attachment to the wheel.

The rib 22 is of ample width to accommodate the attachment bolts 17 generally centrally therein and afford ample clearance for a bolt manipulating wrench. At the radially outer side of the rib 22, it is formed with a generally axially extending flange 27 which projects axially outwardly from juncture with the base wall 24 and joins the radially inner extremity of the trim ring annular portion 20 by way of a generally axially outwardly projecting annular reinforcing rib 28. The outer or peak portion of the rib 28, it will be observed, is off-set axially outwardly from the adjacent area of the trim ring annular portion 20 which it joins, but the annular portion 20, of course, extends to a substantial extent out beyond the rib 28 both radially outwardly and axially outwardly so that in effect, the rib 28 is at the inside of the dished formation provided by the trim ring portion 28 and relatively closely adjacent to the bottom of the dished portion but spaced from the bottom of the rib 22 by the axial flange 27. The radially inner side of the rib 22 is formed by the margin of the hub crown portion 23. Thus, the rib 22 affords an intermediate axially outwardly opening groove intermediate the trim ring portion 20 and the crown portion 23 of the cover member 19.

In applying the cover to the wheel, the cover member 19 is assembled concentrically with the wheel and the attachment bolts 17 secured through the registering bolt apertures 16 and 25 of the bolt-on flange of the wheel and the bottom wall 24 of the intermediate rib 22 of the cover member which in this instance serves as a bolt-on flange. When the bolts 17 are tightened up they draw the cover member 19 axially inwardly and place the outer margin of the trim ring portion 20 under tension against the tire rim shoulder 18. This affords a snug, rattle free arrangement. In the attached condition of the cover, contact between the cover and the wheel is made only between the edge 21 of the cover and the bolt-on bottom wall flange portion 24 thereof. The remainder of the cover is spaced from all parts of the tire rim and the wheel body.

An ornamental closure for the outwardly opening groove of the rib 22 is afforded by an ornamental annular bead 29 which is of a width to extend between the rib 28 and the side of the crown portion 23 and provide an attractive cover assembly with the attachment bolts concealed behind the bead 29. In a preferred form, the bead member 29 comprises a generally radially extending body portion 30 having its radially inner margin turned under to afford a reinforcing flange 31 which is adapted to rest snugly against the side of the crown 23. From the reinforced edge 31, the bead body extends on a transverse convex curvature radially outwardly and preferably at least slightly axially inwardly to a radially outer marginal rib 32 formed by an underturned flange 33 which extends radially inwardly and then axially inwardly to afford an attachment flange portion 34, the axially inner terminal of which is turned axially outwardly upon itself to afford a reinforcing and attachment bead 35.

For engagement by the attachment bead 35, the cover flange 27 is formed with an equally spaced series of radially inwardly protruding integral retaining bumps 37. As best seen in Figure 2, the bumps 37 are preferably formed on an extension of the curvature of the rib 28 and extend axially inwardly to a slightly greater extent than the axial extent of the retaining flange portion 34 so that when the ornamental bead 29 is fully assembled, the reinforcing inner marginal bead 35 cammingly engages the inner ends of the bumps 27 and by which action the ornamental bead is held firmly in seating engagement with the rib 28. The diameter of the ornamental bead 29 is such that the radially outer marginal reinforcing rib 32 seats against the rib 28 and these ribs cooperate to provide a generally radially outwardly opening juncture groove therebetween into which the end of a pry-off tool such as a screwdriver (not shown) is adapted to be inserted to pry the ornamental bead 29 free from the retaining bumps 37 when it is desired to gain access therebehind to the attachment bolts 17. Inasmuch as the rib 28 is off-set axially outwardly relative to the adjacent area of the trim ring annular portion 20, engagement of the pry-off tool with the cover member 19 is limited to the rib 28 and there will be little, if any, danger of the surface of the trim ring portion 20 being marred or damaged by the pry-off tool.

In assembling the generally L-shaped ornamental bead 29 with the cover member 19, the bead is centered about the crown 23, with the attachment leg 34 of the bead at the radially inner side of the rib 28 and the bead is then pressed axially inwardly to spring the attachment leg 34 thereof over the bumps 37 into retained engagement wherein the shoulder 32 engages the rib shoulder 28 and the underturned inner margin 31 engages the side of the crown portion 23.

As best seen in Figure 2, in full assembly, the ornamental bead member 29 is disposed substantially axially inwardly relative to the surfaces of the major areas of the trim ring portion 20 and the crown 23. This is conducive to a highly ornamental effect. For example, by having the outer surface of the ornamental bead body 30 of a finish that contrasts with the trim ring portion 20 and the hub cap crown portion 23, a pleasing effect is attained. Where the outer surfaces of the trim ring portion 20 and the surface of the crown 23, or either of such surfaces, is of a polished, reflecting finish, at least certain areas of such surfaces adjacent to the bead 29 will catch and reflect the color of the outer surface of the bead body 30. In a practical example, the bead 30 has been gold plated on the outer face of the body 30 and the outer surfaces of the trim ring portion 20 and the crown 23 have been finished with a high reflecting luster, as by making the cover member 19 of stainless steel and highly polishing the outer surface thereof. As a result, the gold finish of the bead has been reflected by at least substantial areas of the trim ring portion 20 and the crown portion 23, thus giving the visual effect on the outside of the cover of a substantially greater area thereof than merely the bead 30 being gold plated. The advantage of this is apparent when it is considered that gold plating is relatively expensive and thus by having but a relatively small area gold plated the appearance is afforded of a substantially greater area being gold plated.

To enhance the ornamental reflecting qualities of the cover components, the trim ring cover portion 20 is preferably formed on a concave cross sectional contour so that a substantial outer area thereof, due to the generally axially inwardly tilted arrangement of this portion of the cover and thus the generally radially inwardly facing nature of the reflective surface thereof, will capture on at least a large portion of the reflective surface the color of the outer surface of the relatively inset bead 29. In further enhancement of this ornamental feature, the body portion 30 of the bead is tilted toward the trim ring portion 20. However, the tilting of the bead body 30 is so related to the crown 23 that at least a substantial band area of the crown axially outwardly from the edge 31 of the bead will capture the golden reflection from the bead and thus enhance the attractive ornamental visual effect.

It will be observed that while the outer margin 21 of the cover member 19 is disposed well axially inwardly from the terminal extremity of the terminal flange 10 and is thus thoroughly protected against curbing damage, the crown portion 23 is also disposed axially inwardly from the plane defined by the edge 21 thus being further protected against curbing damage.

For passage of the valve stem 13, the trim ring portion 20 may be formed with a stem clearance aperture 38.

In the modification of Figure 3, all essential features are substantially like those described in Figure 2 except that the cover 5' has the trim ring portion 20' thereof formed on a convex radius rather than a concave radius. This may be desirable in order to afford greater clearance between the trim ring portion and the wheel components therebehind, or it may be desirable in order to attain a particular ornamental effect since it will be apparent that a convex curvature rather than concave curvature as in Figure 2, will afford a somewhat different reflective visual effect of the surface ornamentation such as gold plating on the outer face of the bead 29. In other respects the cover 5' is substantially like the cover of Figures 1 and 2, and, of course, the wheel assembly including the tire rim and the wheel body are of the same construction. Accordingly, similar reference numerals indicate that the indicated parts are to be identified coincident with the parts similarly identified in Figures 1 and 2.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wheel structure including a tire rim and a wheel body, the wheel body being set in from the outer side of the tire rim and having a bolt-on flange near the median plane of the wheel with substantially clear access from an axially outer side point on the tire rim to the bolt-on flange of the wheel body, said bolt-on flange having apertures through which retaining bolts extend for securing the wheel in service position on a vehicle, a wheel cover assembly including a circular cover member having a radially outer generally radially and axially inwardly extending annular portion adapted to extend from said point on the tire rim to the bolt-on flange and including a central axially outwardly convex hub cap simulating crown portion joined with the radially outer annular portion by an axially inwardly directed flat bottomed rib defining an axially outwardly opening annular junction groove and seating retainingly against the bolt-on flange of the wheel body, said flat bottom of said rib having holes therein registering with said apertures and having the retaining bolts securing said flat bottom to the bolt-on flange to thereby secure the cover on the wheel, and an ornamental bead bridging between the annular and crown portions and engaging in press-on, pry-off relation with one of said portions and concealing said outwardly opening junction groove and the retaining bolts.

2. An ornamental wheel cover for disposition at the outer side of a vehicle wheel, said wheel cover including a circular cover member and having an annular trim ring portion and a central hub cap simulating crown portion with an intervening axially inwardly extending flat bottomed rib affording an axially outwardly opening annular groove, one of said portions having retaining means at said rib within the groove defined thereby and spaced inwardly from the mouth of the groove on the contiguous wall of the rib defining said groove, and an ornamental bead for retainingly engaging said retaining means and closing the groove, said bead having means thereon extending inwardly therebehind alongside said wall and retainingly engaging with said retaining means.

3. An ornamental wheel cover for disposition at the outer side of a vehicle wheel, said wheel cover including a circular cover member and having an annular trim ring portion and a central hub cap simulating crown portion with an intervening axially inwardly extending flat bottomed rib affording an axially outwardly opening annular groove, one of said portions having retaining means at said rib within the groove defined thereby, and an ornamental bead for retainingly engaging said retaining means and closing said groove, the trim ring annular portion having a generally axially outwardly projecting shoulder at the juncture thereof with said groove forming rib and said bead resting thereon and being held thereby in axially outwardly offset relation to the adjacent area of the trim ring portion to facilitate entry of a pry-off tool between said shoulder and the bead.

4. In a wheel cover assembly, a circular cover member comprising an outer annular portion and an inner circular portion and an intermediate annular depressed rib portion affording an outwardly opening groove having a generally axially extending wall defining the same, a substantially L-shaped bead member having an attachment leg extending generally axially inwardly therebehind alongside said wall, and means on said wall within and spaced inwardly from the mouth of the groove afforded by said rib for retaining engagement with said retaining leg for holding the bead in assembly in closing relation to said groove.

5. In a wheel cover assembly, a circular cover member comprising an outer annular portion and an inner circular portion and an intermediate annular depressed rib portion affording an outwardly opening groove having a generally axially extending wall defining the same, a substantially L-shaped bead member having an attachment leg extending generally axially inwardly therebehind alongside said wall, and means on said wall within and spaced inwardly from the mouth of the groove afforded by said rib for retaining engagement with said retaining leg for holding the bead in assembly in closing relation to said groove, said retaining means within the groove comprising a series of radially extending retaining bumps projecting into the groove from said wall.

6. In a cover assembly for disposition at the outer side of a vehicle wheel, a circular cover member having a trim ring portion and an inner circular integral portion with a generally axially inwardly extending flat rib juncture portion between said trim ring and inner circular portion, said rib being defined at its radially outer side by a generally axially extending flange and having a generally axially outwardly projecting annular rib at the juncture of the flange with the trim ring portion, an ornamental bead member for closing the groove formed by said rib and having at its radially outer margin a generally axially inwardly extending retaining leg, said flange having means projecting radially inwardly therefrom engageable in retaining relation with said leg, said bead having a shoulder engaging said axially outwardly extending juncture rib and being thus maintained in axially outward offset relation relative to the adjacent area of said trim ring portion whereby to facilitate insertion of a pry-off tool between said shoulder and said axially projecting rib.

7. As an article of manufacture, a composite wheel cover including a circular cover member having a trim ring portion and a central axially outwardly protruding crown portion and a juncture rib extending axially inwardly between said portions and adapted for attachment of the cover to a wheel, one of said portions having a generally axially outwardly extending rib at juncture thereof with the juncture rib and an ornamental bead attached in snap-on, pry-off relation to the cover member and being of a width to extend between the radially inner margin of the trim ring portion and the side of said crown portion over the annular depression caused by said inwardly extending juncture rib and resting against said outwardly extending rib, whereby said bead is maintained in axially outwardly offset relation to said one portion for ready insertion of a pry-off tool between the outwardly extending bead and the rib.

8. In a wheel structure including a multi-flanged tire rim affording a shoulder at the juncture of intermediate and terminal flanges thereof and a wheel body inset relative to the outer side of the tire rim and having a bolt-on flange adjacent to the median plane of the wheel, with the portion of the wheel body intermediate the bolt-on flange and the tire rim generally clearing a diagonal access plane from said tire rim shoulder to the bolt-on flange, a wheel cover including a generally dished circular cover member having a radially outer margin engaging said tire rim shoulder and an inner bolt-on flange portion engaging the bolt-on flange and held thereagainst under tension, the cover member having a central axially outwardly extending integral crown portion spaced radially inwardly from the radially inner margin of the annular trim ring portion, and an annulus separably secured in concealing relation to said bolt-on flange and spanning across the radially inner margin of the trim ring portion and the side of said crown portion, said radially inner margin of the trim ring portion having a rib projecting axially outwardly from the principal surface thereof adjacent to said bolt-on flange portion and providing a seat for the annulus spacing the annulus from said principal surface and facilitating insertion of a pry-off tool under the annulus.

9. In a wheel structure including a multi-flanged tire rim affording a shoulder at the juncture of intermediate and terminal flanges thereof and a wheel body inset relative to the outer side of the tire rim and having a bolt-on flange adjacent to the median plane of the wheel, with the portion of the wheel body intermediate the bolt-on flange and the tire rim generally clearing a diagonal access plane from said tire rim shoulder to the bolt-on flange, a wheel cover including a generally dished circular cover member having a radially outer margin engaging said tire rim shoulder and an inner bolt-on flange portion engaging the bolt-on flange and held thereagainst under tension, the cover member having a central axially outwardly extending integral crown portion spaced radially inwardly from the radially inner margin of the annular trim ring portion, and an annulus separably secured in concealing relation to said bolt-on flange and spanning across the radially inner margin of the trim ring portion and the side of said crown portion, said bolt-on flange having a plurality of apertures therein for attachment bolts to extend therethrough in attaching the bolt-on flange on the wheel body to a vehicle or the like and said apertures being concealed by said bead.

10. In a wheel cover of the character described, a circular cover member having generally divergently related radially outer trim ring and inner crown portions with a relatively wide intermediate axially outwardly opening groove therebetween defined at its axially inner wall by a bolt-on flange having apertures therein adapted for attachment to the bolt-on flange of a wheel by means of the attachment bolts for the wheel, the radially inner margin of the trim ring portion being formed with an axially outwardly projecting reinforcing rib, and a concealing bead member overlying the groove and having a shoulder engaging against said rib and held thereby in axially upwardly offset relation to the adjacent area of the trim ring portion, the trim ring portion being of concave cross section.

11. In a wheel cover of the character described, a circular cover member having generally divergently related radially outer trim ring and inner crown portions with a relatively wide intermediate axially outwardly opening groove therebetween defined at its axially inner wall by a bolt-on flange having apertures therein adapted for attachment to the bolt-on flange of a wheel by means of the attachment bolts for the wheel, the radially inner margin of the trim ring portion being formed with an axially outwardly projecting reinforcing rib adjacent juncture with the groove, the trim portion projecting substantially axially and radially outwardly beyond the peak of said rib throughout the major area thereof except in a small area adjacent to the rib where the trim ring portion is inset relative to the peak of the rib.

12. An ornamental wheel cover for disposition at the outer side of a vehicle wheel, said cover comprising a circular cover member including a trim ring annular portion and a central crown portion with the trim ring and crown portions separated by an inwardly projecting rib formation having juncture with one of said portions through the medium of a generally axially inwardly extending flange, a bead member spanning between the trim ring and crown portions and having a generally inwardly projecting leg therebehind extending in opposed adjacency to and alongside said flange for effecting attachment of the bead member to said cover member, and cooperating means on said axially extending flange and on said leg retainingly interengaging in press-on, pry-off relation enabling the bead member to be pressed axially inwardly into position and to be pried off axially outwardly.

GEORGE ALBERT LYON.

References Cited in the file of this patent
UNITED STATES PATENTS

| Number | Name | Date |
|--------|------|------|
| 2,133,454 | Hunt | Oct. 18, 1938 |
| 2,212,037 | Lyon | Aug. 20, 1940 |